United States Patent Office 3,047,076
Patented July 31, 1962

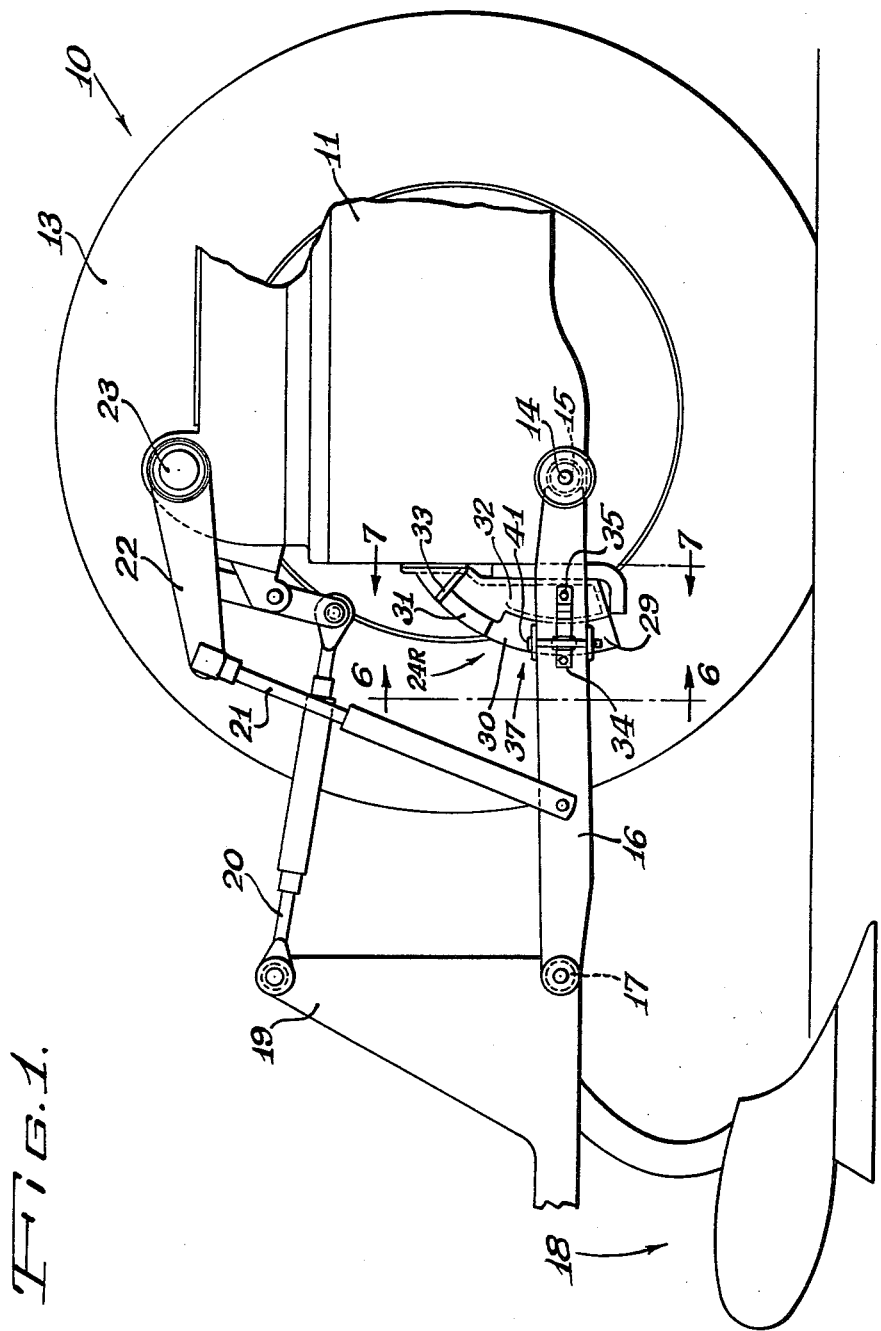

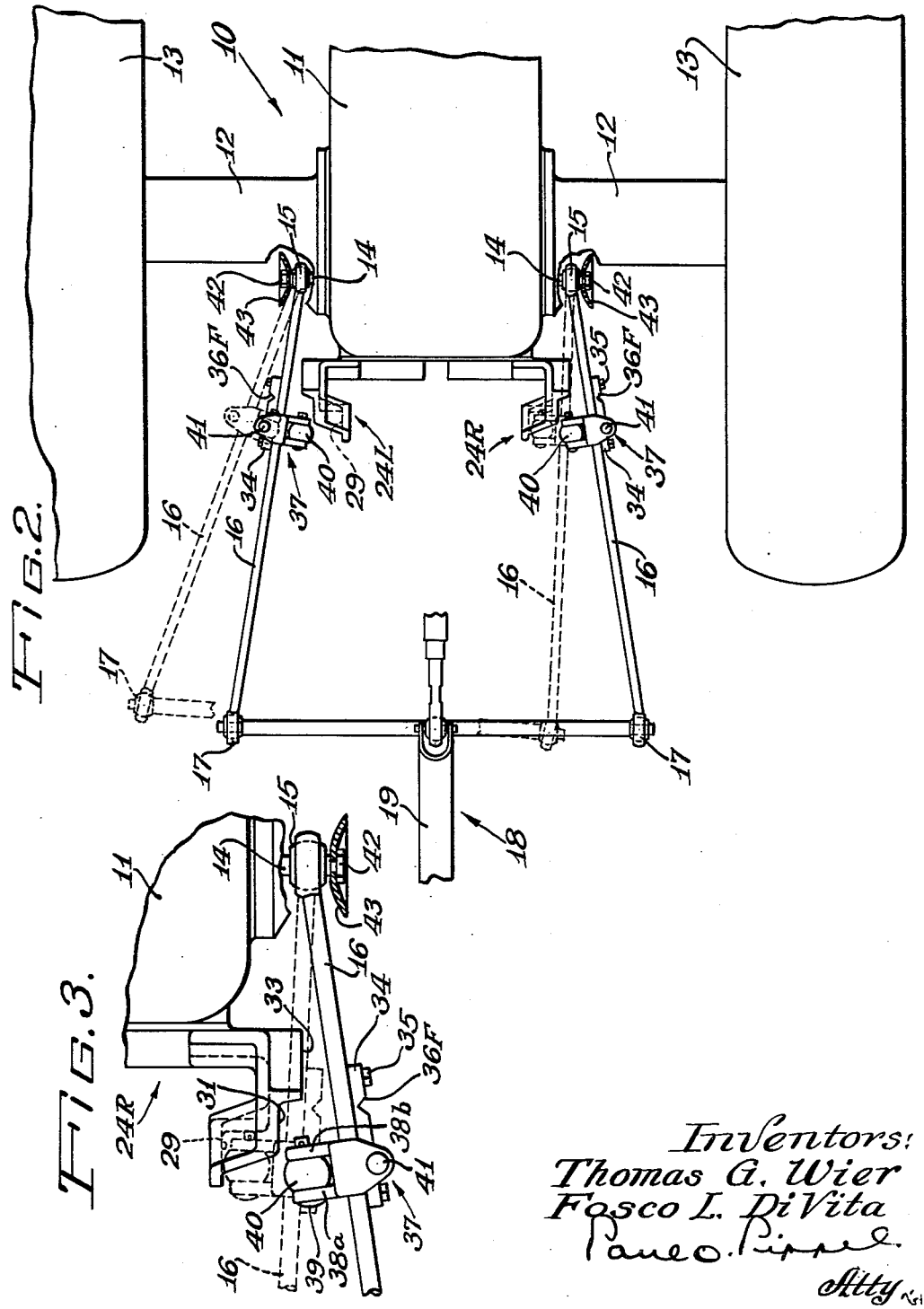

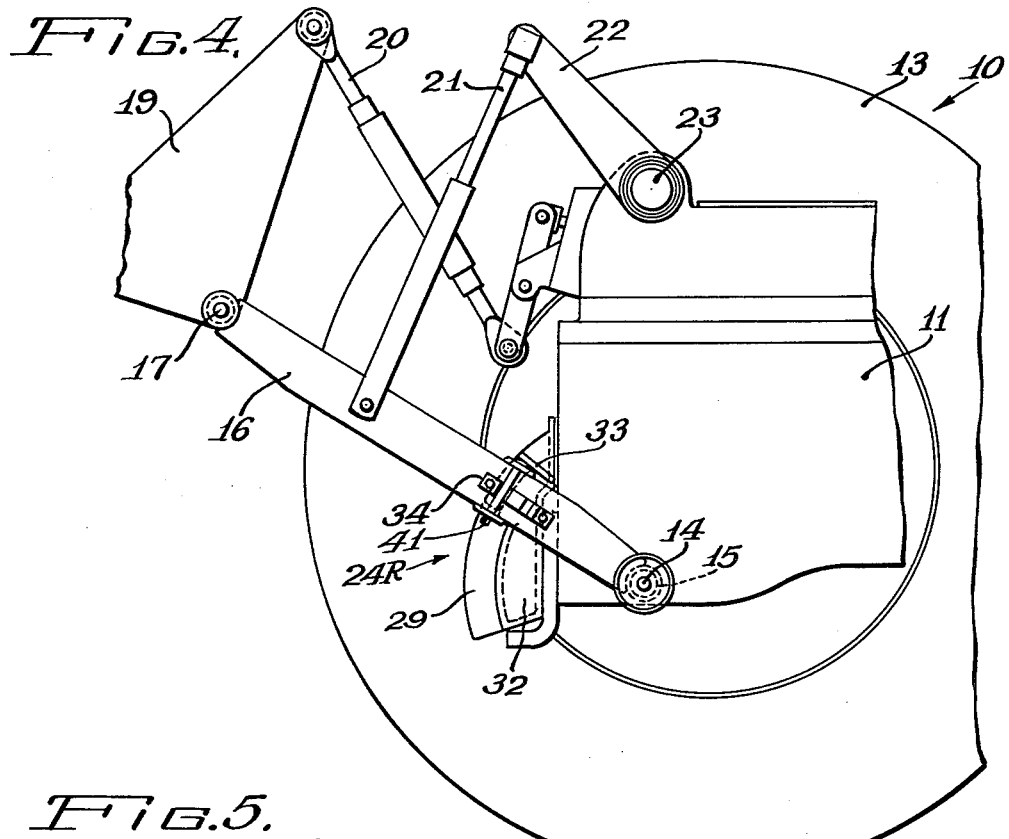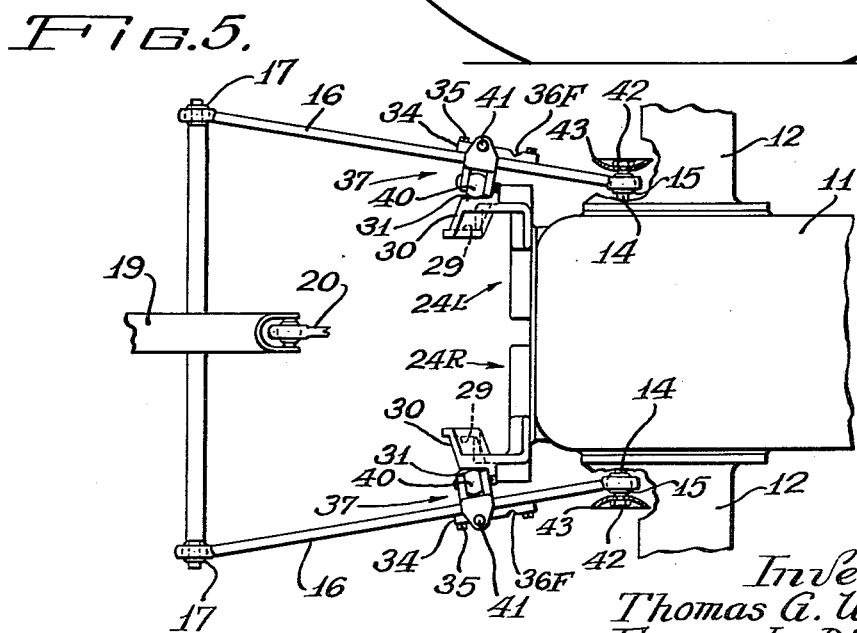

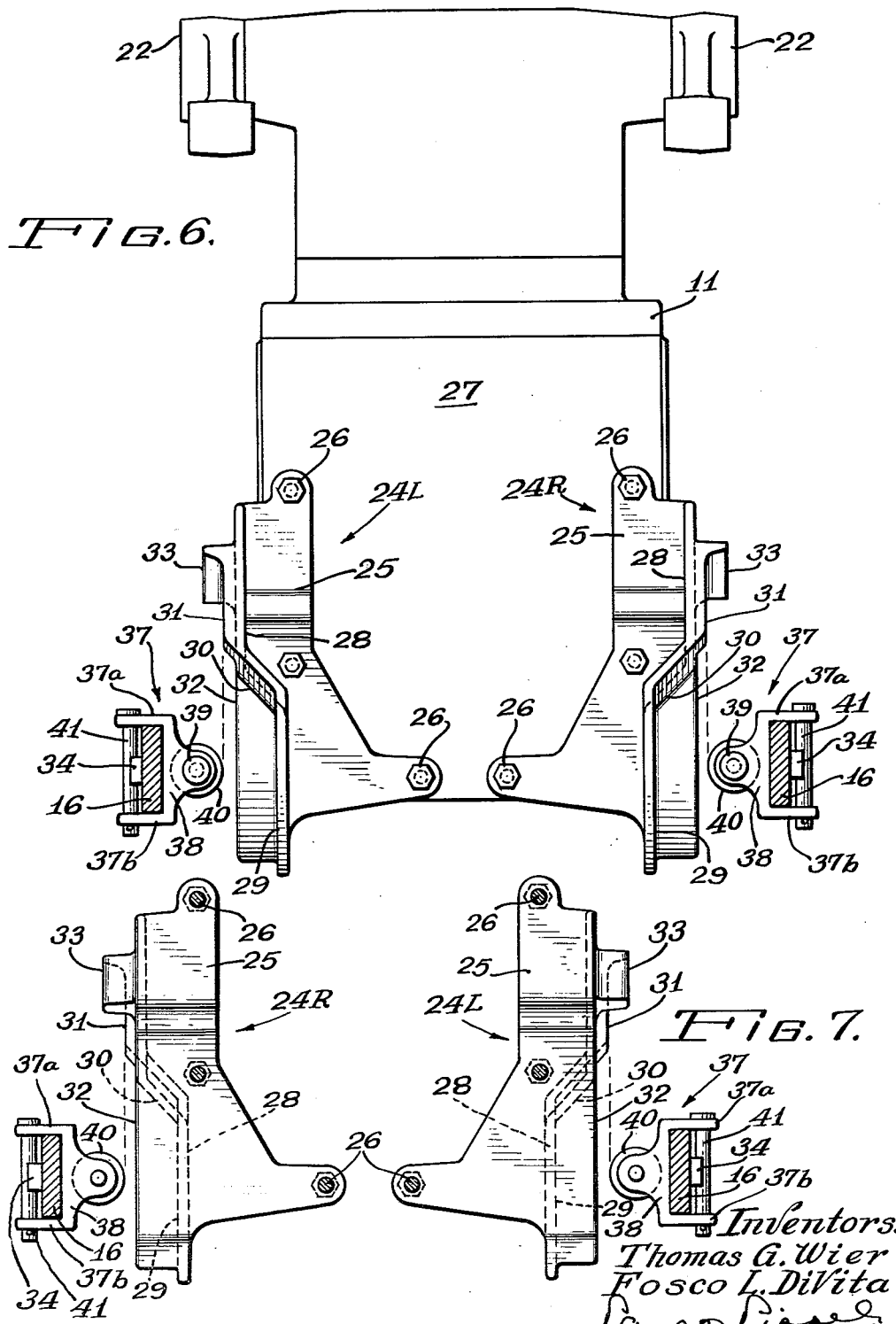

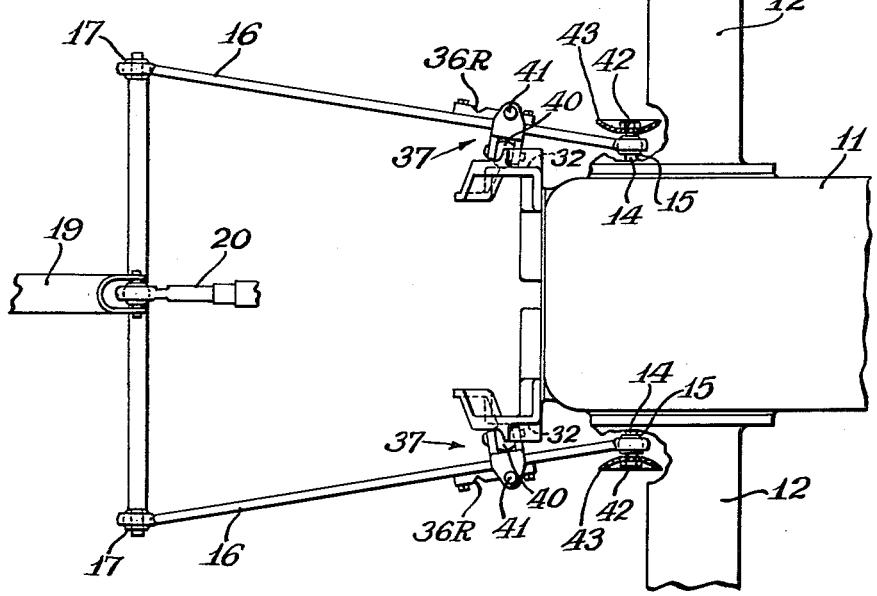
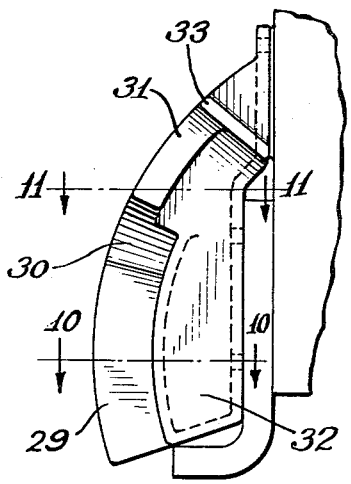
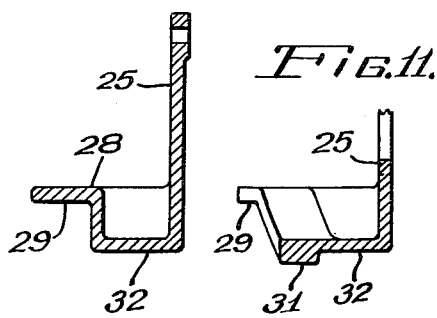

3,047,076
HITCH SWAY LIMITING DEVICE
Thomas G. Wier, Oak Lawn, and Fosco L. Di Vita, Chicago, Ill., assignors to International Harvester Company, Chicago, Ill., a corporation of New Jersey
Filed Nov. 28, 1960, Ser. No. 71,957
12 Claims. (Cl. 172—450)

This invention relates to implement-attaching mechanisms, but more particularly it is concerned with means for limiting side sway or lateral movement in a hitch device of the type used for coupling a ground-working implement to a vehicle such as a tractor.

In certain types of three-point hitch tractor-mounted ground-working implements, such as the moldboard or disc plows, it is desirable that the implement be allowed to sway or move from side to side independently of the movement of the tractor. This is particularly desirable to allow the tractor to be turned at the end of a row, or to follow a prescribed path such as in contour plowing while the attached implement continues to work the soil. Side sway or lateral movement, however, must be controlled and limited so as not to allow interference with the rear drive wheels of the vehicle and, of course, it is desirable that such side sway be reduced to practically nil when the implement is raised to a transport position so as to provide an arrangement that is stable and safe for transporting purposes. Heretofore, such sway-limiting objectives were usually sought after by means of so-called stabilizing or limit chains, which were never completely satisfactory because of the tendency of the chains to stretch and take a permanent set under extreme loads, or the chains, when located between the lower draft links and anchored toward a center rear portion of the vehicle, tended to create an interference condition with certain implements and swinging drawbar attachments, or, when the chains were located on the outside of two lower draft links and anchored outboard on a rear portion of the vehicle, they tended to create a V type wedge which frequently operated to catch and cause resultant damage to certain row crops.

In certain other types of implements, such as the sickle type mower, it is desirable that the implement be restricted from any side sway throughout its working range as well as in its transport position but, since this type implement is not usually a ground-penetrating tool, vehicle maneuverability is not affected by the implement being restricted from side sway. In the past, sway restriction for such implements was frequently accomplished by means of an additional special attachment commonly termed a hitch stabilizer attachment, which usually consisted of two inboard or outboard mounted pivot pin brackets and two links which are interconnected between the pivot pin bracket and the implement-attaching pins, and which, of course, served no useful purpose when other types of implements requiring lateral movement are employed.

It is a primary object of the present invention, therefore, to provide improved and simplified mechanism, particularly adapted for tractors having swingable draft links and power lift apparatus connected with the draft links for raising and lowering an implement attached thereto, for controlling the side sway or lateral swinging movements of said draft links in all operating and transport positions of any implement when attached by said draft lines.

Another object is to provide sway controlling means, for hitch mechanisms of this type, which are arranged for selectively permitting limited lateral sway of an attached implement in its operating position or for completely restricting such a lateral sway in any raised or lowered position of the implement attached thereby.

A further object is to provide sway controlling mechanism so arranged that in one selected adjustment thereof an implement attached to the associated hitch device will be permitted limited sway in an operating or lowered operating position while no sway will be permitted in the raised or transport position thereof, and in another selected adjustment thereof the implement will be permitted no lateral sway movement either in the operating or transport positions thereof.

A more specific object is to provide sway controlling means for a hitch mechanism wherein cam surfaces affixed to the vehicle are disposed to selectively engage roller elements carried by the draft links of the hitch mechanism and which rollers are shiftable longitudinally thereof for selectively engaging any one of a plurality of said cam surfaces.

The foregoing and other objects and features of the invention will become apparent as the disclosure is more fully made in the following detailed description of a preferred embodiment of the invention as illustrated in the accompanying sheets of drawings in which:

FIGURE 1 is a side-elevational view, generally fragmentary in nature, showing an implement-attaching hitch mechanism having incorporated therein the improved sway controlling means of the present invention, and shown with an implement of the type wherein limited side sway is permitted in a lowered or operating position;

FIGURE 2 is a plan view, with certain components of the lifting mechanism being omitted, of the structure shown in the preceding view and with the outer limits of side sway of the draft links on one side being shown in broken lines;

FIGURE 3 is a fragmentary view, in enlarged detail, of the sway limiting structure in association with one of the draft links;

FIGURE 4 is a side-elevational view similar to FIGURE 1, but showing the hitch mechanism raised to a transport position.

FIGURE 5 is a plan view of the arrangement shown in FIGURE 3;

FIGURE 6 is a vertical sectional view, in enlarged detail, taken generally along the line 6—6 of FIGURE 1.

FIGURE 7 is a vertical sectional view, in enlarged detail, taken generally along the line 7—7 of FIGURE 1.

FIGURE 8 is a plan view generally similar to FIGURE 5, but showing the hitch mechanism in a transport position and wherein the cam followers have been moved forward to engage a different cam surface so as to prevent side sway in the raised as well as the lowered operating position of the hitch;

FIGURE 9 is a fragmentary side elevational view of the cam surfaces of one of the cam-containing bumper structures; and FIGURES 10 and 11 are horizontal sectional views taken generally along the respective lines of FIGURE 9.

Since the proposed device is adaptable for use with a variety of conventional types of tractor vehicles, the particular vehicle which it is illustrated as being associated with herein is depicted only fragmentarily and is seen as represented in its entirety by the reference numeral 10. As shown, this includes a main frame or chassis structure 11, which it should be understood would conventionally support all the well-known power and drive components of such a vehicle, and, additionally having laterally outwardly extending rear axle housings 12, 12 which at their outer ends support ground-engaging means, such as the wheels 13, 13.

Suitably mounted on opposite sides of the main frame structure 11, are draft link pins 14, 14 which extend laterally outwardly therefrom and receive laterally apertured captive ball connectors 15, 15 swiveled in spherical openings in the forward ends of a pair of draft links 16, 16 which, in turn, extend rearwardly therefrom and diverge outwardly away from one another. The rearward ends of said draft links may be provided with similar ball-type connections 17, 17 to accommodate in well-known fashion an implement, such as the plow indicated generally at 18, while the upper portion of the rigid mast 19 thereof many be pivotally connected, by suitable linkage such as shown generally at 20, to the tractor main frame 11 as is well understood. Drop links, such as 21, 21, pivotally connect the respective draft links 16, 16 to the associated left links 22, 22 (only one of which is shown) which, in turn, are constrained for rotation with the rockshaft 23 which may be operated by suitable power lift means (not shown) for raising and lowering the hitch mechanism all as is well understood and conventional in the art.

As thus arranged, it will be appreciated the draft links 16, 16 are readily swingable from side to side about the axis defined by the forward ball connectors 15, 15 and, additionally, are swingable about the same pivots in a vertical plane upon operation of the power lift means.

Now, in accordance with the more specific teachings of the invention, there is provided a pair of bumper-like structures, such as the left-hand member indicated 24L and the right-hand member shown at 24R. These structures are complemental, being reversely arranged so as to make one suitable for functioning on the right and the other one on the left side of the vehicle. Each such bumper structure is fashioned with a body or rear wall portion 25 through which suitable fastening means such as the bolts or cap screws 26, may be positioned to affix or fasten the structures in laterally spaced-apart relation to one another on a vertical rear surface 27 of the tractor main frame 11 at points intermediate the rearwardly extending draft links 16, 16. Each of said bumper structures is fashioned with a generally vertically extending wall member 28 that projects rearwardly outwardly from the body 25 thereof. Said latter wall is fashioned to include a first surface 29 that extends vertically upwardly from the bottom and at the rearmost portion of the wall, a second surface 30 that joins and extends upwardly and outwardly from the upper end of said first surface, a third surface 31 that joins and extends vertically upwardly from the upper end of said second surface, and a fourth surface 32 that extends vertically upwardly from the bottom of the wall 28 and is disposed forwardly of the aforesaid surfaces thereof. All of these surfaces may be said to define cam-tracks which are adaptable for engagement with a cam follower means as will be hereafter described and hence these members might be spoken of as camming structures. A raised rib or lip portion 33 at the upper ends of the camming surfaces and extending thereacross provides a stop or abutment for purposes which will subsequently be apparent.

As will be seen by reference to the various figures of the drawings, all of these cam-track surfaces are disposed in different vertical planes which all parallel an extension of the longitudinal axis of the vehicle and with the first surface 29 being closest to said central longitudinal axis, the fourth surface 32 being next closest to said axis, while the third surface 31 is farthest therefrom. The surfaces 29, 31, 32 all parallel one another even though they lie in different fore-and-aft vertical planes. It will be seen, also, that the surfaces 29 and 29, 31 and 31, and 32 and 32 of the respective left and right bumper structures will be parallel to one another, while the inclined surfaces 30, 30 thereof diverge upwardly and outwardly away from one another so as to provide a wedge-like guide when engaged by the cam follower means as will presently be apparent.

As will be seen from the side-elevational view of FIGURE 9 the cam-track defining surfaces 29, 30, 31 and 32 on each of the bumper or camming structures are fashioned with the aft or rearmost end edges and the fore and forwardmost end edges of surfaces 29, 30 and 31 generally arcuate in vertical extent with the radius thereof centered about the respective pivotal connections 15, 15 of the associated draft links 16, 16.

Each of the draft links 16 has mounted on the outer face thereof a detent bar 34, which may be fastened thereto by suitable securing means, such for instance, as the bolts, or cap screws 35, and each such bar is provided with a pair of longitudinally spaced vertically extending notches or grooves 36F, 36R that open outwardly toward the outer surface thereof. The particular shape or cross-sectional configuration of these notches is not particularly important so long as they are adaptable to receive in detent fashion an interlocking pin or stud as will be seen.

Slidably positioned on each of the draft links is a keeper bracket, such as indicated generally at 37, which is fashioned to resemble an overturned U-shape in cross-section and includes a pair of parallel spaced-apart horizontal arms 37a and 37b interconnected by a central arm 38. The central or vertical member 38, in turn, is fashioned with a pair of vertically spaced-apart inwardly extending ears or lugs 38a, 38b having horizontally aligned apertures therein for receiving a headed pin or shaft 39 that journals a slightly crowned roller member 40. Vertically aligned apertures in the outer ends of the upper and lower arms 37a, 37b, of the keeper 37, accommodate a removable headed pin or stud 41 which, additionally, is receivable in one of the notches or grooves 36F, 36R of the detent bar 34 thereby providing, in effect, an interlocking detent and indexing device for said keeper. In order to move the keeper from one notch to another, or from a forward to a rear position and vice versa, it is only necessary to remove the pin 41 and then slide the keeper to the position desired and thereafter re-position the pin in said vertically aligned apertures and in the appropriate notch 36F or 36R. These brackets with their rollers provide adjustable cam follower means for engaging the various cam-tracks in the bumper or camming structures according to the selected fore-and-aft position thereof on the draft links.

The pivotal mounting draft link pins 14, 14 may be threaded on the outer ends thereof to receive locking nuts 42, 42 and hold conical-shaped abutment or stop members 43, 43 thereon. This abutment or guard member is dimensioned and arranged so as to prevent the associated draft link 16 from swinging into contact with the proximate wheel of the vehicle at times when there might not be an implement attached to the vehicle hitch and the draft links would be generally free to swing sideways at will. The extreme side sway position to one side of the vehicle for these draft links under such free condition are shown in broken lines in FIGURE 2.

When the tractor is operated with a ground-penetrating type of implement requiring lateral movement, such as the plow 18, the pins 41, 41 of the keeper brackets 37, 37 are positioned in the rearmost notches 36R, 36R, whereupon the follower rollers 40, 40 will be spaced from the respective cam-track surfaces 29, 29 so long as the hitch is in its lowered or operating position, such as is indicated in FIGURES 1–3, and limited side sway or lateral movement will thereby be permitted. Now when the hitch is raised, for instance, to the transport position, such as seen in FIGURES 4 and 5, the rollers 40, 40 will engage the respective cam-track surfaces 31, 31 in closely abutting relation and the draft links thus will be constrained against lateral sway relative to the vehicle. While being raised from the lowered operating position to the transport position the draft links 16, 16 are frequently off-center or displaced sideways so that one of the rollers 40 may be in contacting engagement with a proximate cam surface 29, whereupon as the links are raised the associated roller will encounter the proximate outwardly diverging surface 30 and the draft links will then be guided into a centered position for engagement with the cam-track surfaces 31, 31.

When the tractor is to be operated with an implement of the type which does not require lateral movement, such as in the case of a sickle bar mower, the keeper brackets 37, 37 are moved forwardly and the pins 41, 41 thereof are positioned in the forwardmost notches 36F, 36F, whereupon the follower rollers 40, 40 will engage the respective cam-track surfaces 32, 32 (FIG. 8) and will continue to engage these surfaces in closely abutting relation regardless of whether the draft links are in their lowered or raised positions. It will be seen that because of the inwardly converging forward ends of the draft links the rollers 40, 40 in their forwardmost positions are spaced closer together, hence the engageable cam-track surfaces 32, 32 are correspondingly inwardly spaced from the planes that contain the surfaces 31, 31.

It will be seen, therefore, that the proposed invention provides a very simple, effective and flexible means for controlling lateral sway in an implement-attaching hitch mechanism. Furthermore, it will be appreciated that such an arrangement is readily adaptable for use with a great variety of vehicle-borne implements, and, of course, is readily adaptable for use with most of the conventional hitching devices presently being operated.

While only one form of the invention has been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a hitch mechanism for supportably and detachably fastening an earthworking implement to a tractor, the combination, comprising: a pair of generally fore-and-aft extending laterally spaced-apart draft links pivotally mounted at the forward ends thereof on a rear portion of the tractor for lateral and vertical swinging; a pair of structures laterally spaced apart and affixed to the tractor intermediate said draft links; each of said structures being fashioned to provide a first upward extending surface, a second surface extending upwardly and outwardly diverging from the upper end of said first surface, a third surface upwardly extending from the upper end of said second surface, and a fourth surface extending vertically and being disposed forwardly of said first, second and third surfaces; abutment means movably mounted one each on said draft links and being displaceable fore-and-aft for alignment and selective contacting engagement with certain of the surfaces on said structures; said abutment means being positionable in one fore-and-aft disposed position thereof for engagement with said fourth vertical surfaces to prevent lateral sway of said draft links in either the raised or lowered positions of said links, and in another fore-and-aft disposed position thereof for engagement with said third surfaces to prevent lateral sway of said draft links when said links are in a raised position while being spaceable from said first surfaces to permit limited lateral sway of said draft links when said links are in a lowered position.

2. In a hitch mechanism for supportably and detachably fastening an earthworking implement to a tractor, the combination, comprising: a pair of generally fore-and-aft extending laterally spaced-apart draft links pivotally mounted at the forward ends thereof on a rear portion of the tractor for lateral and vertical swinging; a pair of bumper structures laterally spaced apart and affixed to the tractor intermediate said draft links, and having each of said bumper structures fashioned to provide a first upwardly extending surface, a second surface extending upwardly and diverging outwardly from said first surface, a third surface upwardly extending from said second surface, and a fourth surface extending vertically and being disposed forwardly of said first, second, and third surfaces; said surfaces being further fashioned to define respective first, second, third and fourth cam-tracks; cam-follower means adjustably positionable for fore-and-aft adjustment one each on said draft links and being disposed for selective coaction with certain of said cam-tracks; said cam-follower means being disposed in one position thereof for engaging contact with said respective fourth cam-tracks to prevent lateral sway of said draft links in all raised and lowered positions of said links, and in another position thereof being disposed for engaging contact with said respective third cam-tracks to prevent lateral sway of said draft links when said links are in a raised position while being concurrently spaceable from said respective first cam-tracks to permit limited lateral sway of said draft links when said links are in a lowered position.

3. The structure described in claim 2 and further characterized in that the surfaces defining said fourth cam-tracks are disposed in vertical planes inwardly displaced from vertical planes that contain the surfaces defining said third cam-tracks.

4. The structure described in claim 2 and further characterized in that the surfaces defining said fourth cam-tracks are disposed in vertical planes inwardly displaced from vertical planes that contain the surfaces defining said third cam-tracks by an amount corresponding with the amount of divergence of said draft links between the fore-and-aft positions of said cam-follower means.

5. The structure described in claim 2 and further characterized in that the cam-follower means are fashioned with individual cam-followers that project inwardly toward one another from an inner longitudinally extending surface of each respective draft link.

6. The structure described in claim 1 and further characterized in that said first, third and fourth surfaces of each structure are parallel to one another and to the corresponding surfaces of the other structure, while the respective second surfaces of said structures diverge outwardly away from one another.

7. In a hitch mechanism for supportably and detachably fastening an earthworking implement to a tractor, the combination comprising: a pair of generally fore-and-aft extending laterally spaced-apart draft links pivotally mounted at the forward ends thereof on a rear portion of the tractor for lateral and vertical swinging; a pair of bumper structures laterally spaced apart and affixed to the tractor intermediate said draft links, and having each of said bumper structures fashioned to provide a first upwardly extending surface, a second surface extending upwardly and diverging outwardly from said first surface, a third surface upwardly extending from said second surface, and a fourth surface extending vertically and being disposed forwardly of said first, second, and third surfaces; said surfaces being further fashioned to define respective first, second, third and fourth cam-tracks; follower means adjustably positionable for fore-and-aft adjustment one each on said draft links and being disposed for selective coaction with certain of said cam-tracks; said follower means including rollers rotatably mounted for rotation on fore-and-aft extending axes and being disposed in one fore-and-aft displaced position thereof for engaging contact with said respective fourth cam-tracks to prevent lateral sway of said draft links in all raised and lowered positions of said links, and in another fore-and-aft position thereof being disposed for engaging contact with said respective third cam-tracks to prevent lateral sway of said draft links when said links are in a raised position while being concurrently spaceable from said respective first cam-tracks to permit limited lateral sway of said draft links when said links are in a lowered position.

8. In a hitch mechanism for supportably and detachably fastening an implement to a vehicle, the combination, comprising: a pair of generally fore-and-aft extending and spaced-apart draft links; means mounting the forward ends of said draft links on the rear portion of the vehicle for lateral and vertical swinging; a pair of camming structures laterally spaced apart and affixed to the vehicle intermediate and independent of said draft links, and having each of said structures fashioned to provide a first vertically extending surface, a second surface extending vertically and diverging outwardly from said first surface, a third surface extending vertically from said second surface, and a fourth surface extending vertically and being disposed forwardly of said first, second and third surfaces; said surfaces being further fashioned to define respective first, second, third and fourth cam-tracks which lie in planes that parallel an extension of the longitudinally extending axis of the vehicle; a pair of brackets slidably mounted one each on a respective draft link; detent means cooperative between said brackets and said draft links and adjustable for positioning said brackets in any one of a plurality of longitudinally spaced positions along said draft links; roller means carried by said brackets and disposed for selective engagement with certain of the cam-tracks of said structures; said brackets being arranged so that in one position thereof said rollers are engageable with said fourth cam-tracks to prevent lateral sway of said draft links in all raised and lowered positions thereof, and in another position said rollers are engageable with said third cam-tracks to prevent lateral sway of the draft links when in a raised position while being concurrently spaced from said first cam-tracks to permit limited lateral sway when said draft links are in a lowered position.

9. The structure described in claim 8 and further characterized in that each of said brackets is fashioned to resemble an overturned U-shape in cross-section and are additionally provided with inwardly extending and spaced-apart lugs that rotatably carry said rollers thereon.

10. The structure described in claim 9 and further characterized in that each of said brackets is provided with a pair of aligned apertures in the arms thereof and which are disposed so as to be outside the outer longitudinally extending vertical surface of a respective draft link; and wherein each of said detent means includes a plural-notched bar affixed to said outer longitudinally extending vertical surface of said respective draft link and a removable pin is receivable in a selected one of said notches and in the aligned apertures of said respective brackets so as to restrict free slidable movement of said brackets along the respective draft links.

11. The structure described in claim 8 and further characterized in that the rearwardly extending end edges of said first, second, third and fourth surfaces, and the forward end edges of said first, second and third surfaces are arcuately fashioned with the radius of said curvature centered about the respective pivotal connections of said draft links.

12. In a hitch mechanism for supportably and detachably fastening an earthworking implement to a tractor, the combination, comprising: a pair of generally fore-and-aft extending laterally spaced-apart draft links pivotally mounted at the forward ends thereof on a rear portion of the tractor for lateral and vertical swinging; a pair of structures laterally spaced apart and affixed to the tractor intermediate said draft links; each of said structures being fashioned to provide a first upwardly extending surface, a second surface extending upwardly and outwardly diverging from the upper end of said first surface, a third surface upwardly extending from the upper end of said second surface, and a fourth surface extending vertically and being disposed forwardly of said first, second and third surfaces; abutment means movably mounted one each on said draft links and being displaceable fore-and-aft for alignment and selective contacting engagement with certain of the surfaces on said structures; said abutment means being positionable in one fore-and-aft disposed position thereof for engagement with said fourth vertical surfaces to prevent lateral sway of said draft links in either the raised or lowered positions of said links, and in another fore-and-aft disposed position thereof for engagement with said third surfaces to prevent lateral sway of said draft links when said links are in a raised position while being spaceable from said first surfaces to permit limited lateral sway of said draft links when said links are in a lowered position; and stop means affixed to said tractor adjacent the forward ends of said draft links, including members conical-shaped in cross-section disposed one each adjacent a respective draft link and adaptable for engaging contact with said draft links to limit the extreme lateral sway thereof when said abutment means on said draft links are vertically positioned so as not to be engageable with any of the said surfaces on said pair of structures.

References Cited in the file of this patent

UNITED STATES PATENTS

| | | |
|---|---|---|
| 2,935,145 | Du Shane | May 3, 1960 |
| 2,935,147 | Edman | May 3, 1960 |
| 2,987,126 | Horney | June 6, 1961 |